(12) United States Patent
Hasit

(10) Patent No.: US 8,949,654 B2
(45) Date of Patent: Feb. 3, 2015

(54) PARAMETERIZED DYNAMIC MODEL FOR CLOUD MIGRATION

(75) Inventor: Seth Hasit, Pune (IN)

(73) Assignee: Empire Technology Development LLC, Wilmington, DE (US)

( * ) Notice: Subject to any disclaimer, the term of this patent is extended or adjusted under 35 U.S.C. 154(b) by 209 days.

(21) Appl. No.: 13/582,741

(22) PCT Filed: Mar. 15, 2012

(86) PCT No.: PCT/IB2012/000481
§ 371 (c)(1),
(2), (4) Date: Sep. 4, 2012

(87) PCT Pub. No.: WO2013/110966
PCT Pub. Date: Aug. 1, 2013

(65) Prior Publication Data
US 2013/0198564 A1  Aug. 1, 2013

(30) Foreign Application Priority Data

Jan. 27, 2012  (IN) .............................. 233/DEL/2012

(51) Int. Cl.
*G06F 11/00* (2006.01)
*H04L 29/08* (2006.01)
*G06F 11/14* (2006.01)

(52) U.S. Cl.
CPC ............ *H04L 67/10* (2013.01); *G06F 11/1402* (2013.01)
USPC .......................................................... 714/4.1

(58) Field of Classification Search
CPC ..................................................... G06F 11/20
USPC .......................................................... 714/4.1
See application file for complete search history.

(56) References Cited

U.S. PATENT DOCUMENTS

| 7,085,776 | B2 | 8/2006 | Callahan | |
| 2010/0050172 | A1* | 2/2010 | Ferris | 718/1 |
| 2011/0179142 | A1* | 7/2011 | Ravichandran et al. | 709/218 |
| 2012/0131594 | A1* | 5/2012 | Morgan | 718/105 |
| 2012/0221696 | A1* | 8/2012 | Ferris | 709/223 |
| 2012/0304179 | A1* | 11/2012 | Devarakonda et al. | 718/102 |
| 2012/0311568 | A1* | 12/2012 | Jansen | 718/1 |
| 2013/0086235 | A1* | 4/2013 | Ferris | 709/223 |
| 2013/0138816 | A1* | 5/2013 | Kuo et al. | 709/226 |

OTHER PUBLICATIONS

Hajjat et al. "Cloudward Bound: Planning for Beneficial Migration of Enterprise Applications to the Cloud", SIGCOMM'10, Aug. 30-Sep. 3, 2010, New Delhi, India. Copyright 2010 ACM 978-1-4503-0201—Feb. 10, 2008.
International Search Report and Written Opinion PCT/IB12/000481 filed Mar. 15, 2012, mailed Jul. 2, 2012.

* cited by examiner

*Primary Examiner* — Joshua Lohn
(74) *Attorney, Agent, or Firm* — Turk IP Law, LLC

(57) ABSTRACT

Technologies are generally presented for a migration system and a method for moving data and applications from a cloud or non-cloud network to a cloud network employing a Parameterized Dynamic Model (PDM) having one or more multi-dimensional parameters. In some examples, the PDM parameters may represent the Service level Agreement (SLA) requirements that a target cloud may need to satisfy for a successful cloud migration. The PDM may include a Model Execution Code (MEC) module configured to execute the PDM acting upon the PDM parameter in a cloud environment following the sequencing defined in the PDM as a sequencing parameter. The PDM-MEC based migration system may also include fault-tolerance and error recovery during the migration while the MEC code is executed.

20 Claims, 7 Drawing Sheets

PARAMETERIZED DYNAMIC MODEL FOR CLOUD MIGRATION

CROSS REFERENCE TO RELATED APPLICATIONS

This Application is the National Stage filing under 35 U.S.C. §371 of PCT Application Ser. No. PCT/IB2012/000481 filed on Mar. 15, 2012, which claims priority under 35 U.S.C. §119 (b) to India Application Ser. No. 233/DEL/2012 filed on Jan. 27, 2012. The disclosures of the PCT Application and the India Application are hereby incorporated by reference in their entireties.

BACKGROUND

Unless otherwise indicated herein, the materials described in this section are not prior art to the claims in this application and are not admitted to be prior art by inclusion in this section.

With the advance of networking and data processing technologies, an increasingly high number of services are provided through cloud based service providers. Customer data may be stored and applications hosted at cloud based on requirements specified by Service Level Agreements (SLAs). As the number of cloud based service providers and competition increases, cloud-to-cloud migration of applications and data is becoming a common phenomenon. Even within a cloud based service, data and applications may be moved from one or more servers (a site) to another for various purposes.

Moving an application from an existing cloud to a new cloud may involve negotiation of multiple parameters. For example, if an online retail marketplace is to be moved to a new cloud, then parameters such as transaction processing benchmarks, data redundancy, data security, etc. may need to be available in the target cloud with specific values. Negotiation of performance levels through SLAs may be a cumbersome process and may not always provide an accurate picture, because SLA parameters may be defined differently for different clouds or may not be defined at all in some cases.

Furthermore, some clouds may not be willing to take on the responsibility of judging the performance of another cloud. For example, a source cloud may not take the risk of providing performance predictions about one or more target clouds to its customers, or conversely, the source cloud may not be willing to share its performance information with a target cloud attempting to lure away a customer. Thus, cloud-to-cloud migration through conventional approaches lacks features that can make it automated, reliable, and flexible.

SUMMARY

The present disclosure generally describes technologies for providing a parameterized model for cloud migration.

According to some example embodiments, a method for implementing a parameterized dynamic model (PDM) for cloud migration may include determining a plurality of PDM parameters with each parameter having one or more dimensions, where the PDM defines service level agreement requirements to be met for migration from a source cloud to a target cloud and performing the cloud migration by executing the PDM according to a sequence defined by the PDM.

According to other example embodiments, a computing device for implementing a parameterized dynamic model (PDM) for cloud migration may include a memory configured to store instructions and a processing unit configured to execute a migration application in conjunction with the instructions. The migration application may determine a plurality of PDM parameters with each parameter having one or more dimensions, where the PDM defines service level agreement requirements to be met for migration from a source cloud to a target cloud and execute the PDM according to a sequence defined by the PDM.

According to further example embodiments, a computer-readable storage medium may have instructions stored thereon for implementing a parameterized dynamic model (PDM) for cloud migration. The instructions may include determining a plurality of PDM parameters with each parameter having one or more dimensions, where the PDM defines service level agreement requirements to be met for migration from a source cloud to a target cloud and performing the cloud migration by executing the PDM according to a sequence defined by the PDM.

The foregoing summary is illustrative only and is not intended to be in any way limiting. In addition to the illustrative aspects, embodiments and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
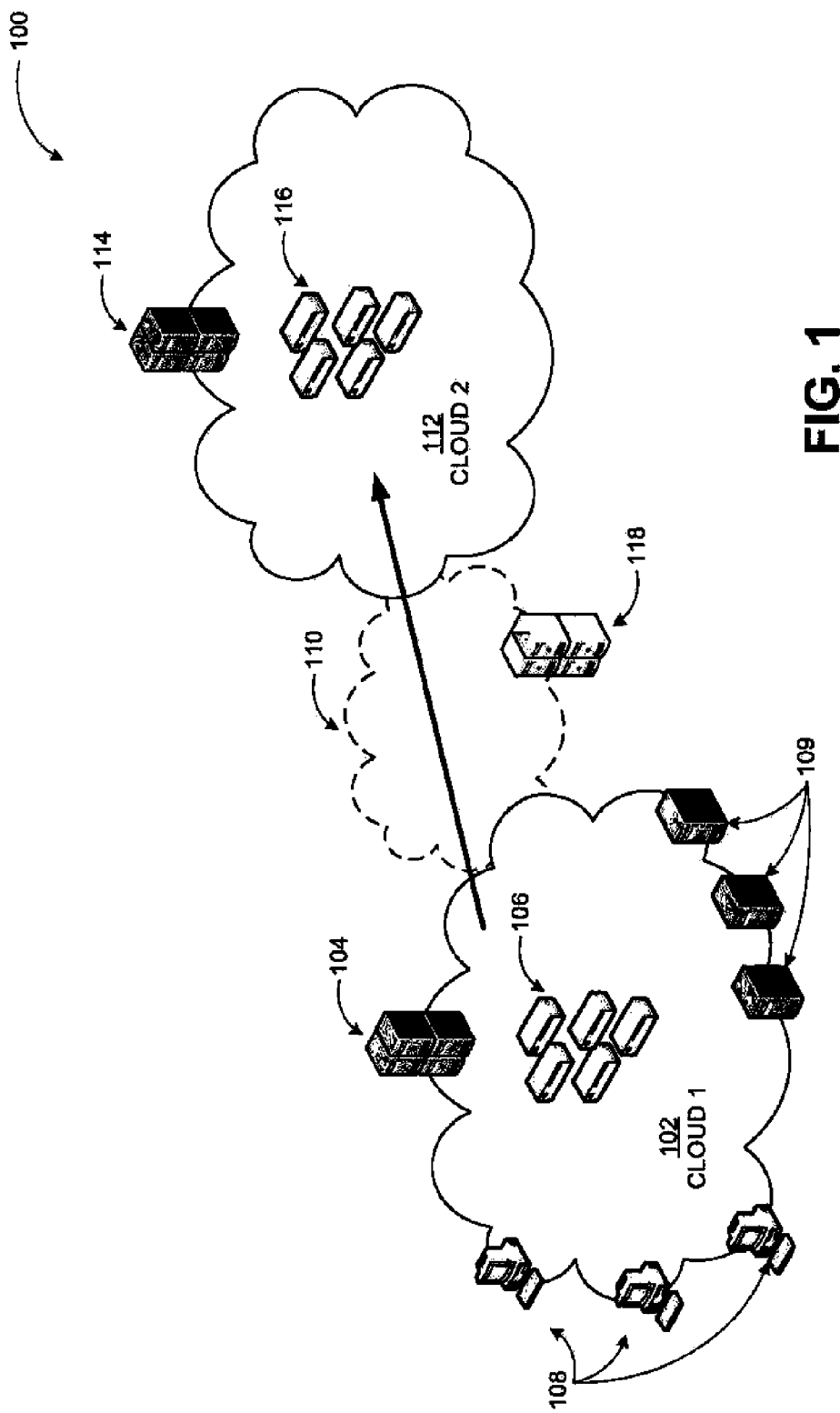
FIG. 1 illustrates an example system, where a parameterized dynamic model (PDM) for cloud migration may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to implementing a parameterized model for cloud migration.

Briefly stated, technologies are presented for a migration system and a method for moving data and applications from a cloud or non-cloud network to a cloud network employing a Parameterized Dynamic Model (PDM) having one or more multi-dimensional parameters. The PDM parameters may represent the Service Level Agreement (SLA) requirements that a target cloud may need to satisfy for a successful cloud migration. The ppm may include a Model Execution Code (MEC) module configured to execute the PDM acting upon the PDM parameter in a cloud environment following the sequencing, defined in the PDM as a sequencing parameter. The PDM-MEC based migration system may also include or provide fault-tolerance and error recovery during the migration while the MEC code is executed.

FIG. 1 illustrates an example system, where a parameterized dynamic model (PDM) for cloud migration may be implemented, arranged in accordance with at least some embodiments described herein.

As shown in FIG. 1, a diagram 100 depicts a service provider 102 (cloud 1), which may host services such as various applications, data storage, data processing, or comparable ones for individual or enterprise customers 108 and 109. The service provider 102 may include one or more sites (groups of servers) providing the services and employ one or more servers 104 and/or one or more special purpose devices 106 such as firewalls, routers, and so on. To provide services to its customers, the service provider 102 may employ multiple servers, special purpose devices, physical or virtual data stores, etc. Thus, an application hosted or data stored by the service provider 102 for a customer may involve a complex architecture of hardware and software components. The service level provided to the customer (owner of the hosted application or data) may be determined based on a number of service parameters such as server processing, memory, and networking, which may be implemented in a particular way by the service provider 102.

Cloud-based service providers may have disparate architectures and provide similar services but with distinct parameters. For example, data storage capacity, processing capacity, server latency, and similar aspects may differ from cloud to cloud. Furthermore, the service parameters may vary depending on the provided service. To automate and enhance an efficiency of cloud-to-cloud (or non-cloud network to cloud) migration, a parameterized dynamic model may be employed according to some embodiments with fault tolerance and backtracking features. Multi-dimensional parameters may be defined completely manually. completely automatically, or semi-automatically along with a sequence of parameters for execution, for example, according to a priority level. A model execution code (MEC) may execute the migration following the sequence of parameters defined in the PDM ensuring a seamless transition based on satisfaction of defined requirements and comparison of service levels at source and target clouds.

In the diagram 100, the service provider 102 (cloud 1) may be a source cloud and a service provider 112 (cloud 2) may be a target cloud in a migration process. Similar to the service provider 102, the service provider 112 may also employ one or more servers 114 and one more special purpose devices 116 to provide its services. PDM definition and MEC execution may be managed and performed by one of the servers 104 of the service provider 102, one of the servers 114 of the service provider 112, or by a third party service executed on one or more servers 118 of another cloud 110.

Figure 2:
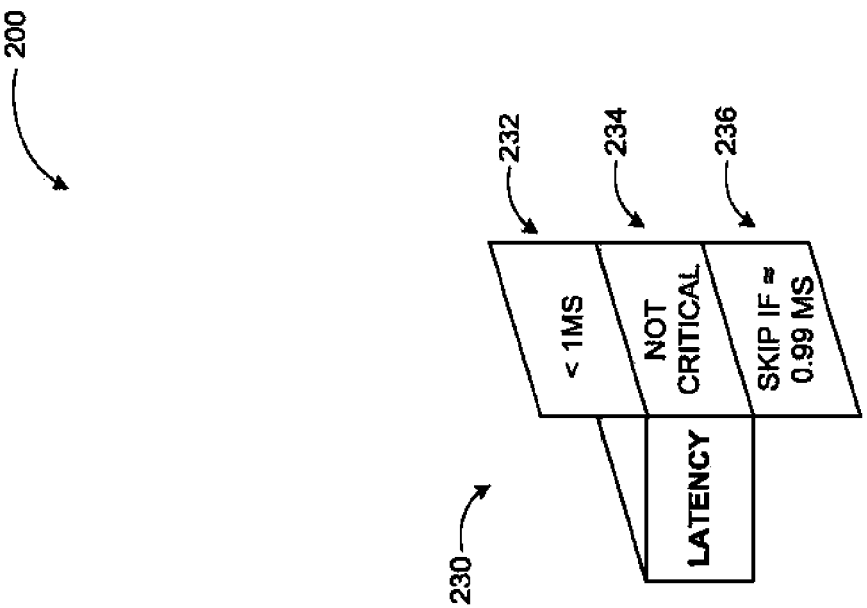
FIG. 2 conceptually illustrates an example parameterized dynamic model and an example PDM parameter that may be used in cloud migration.
Figure 2:
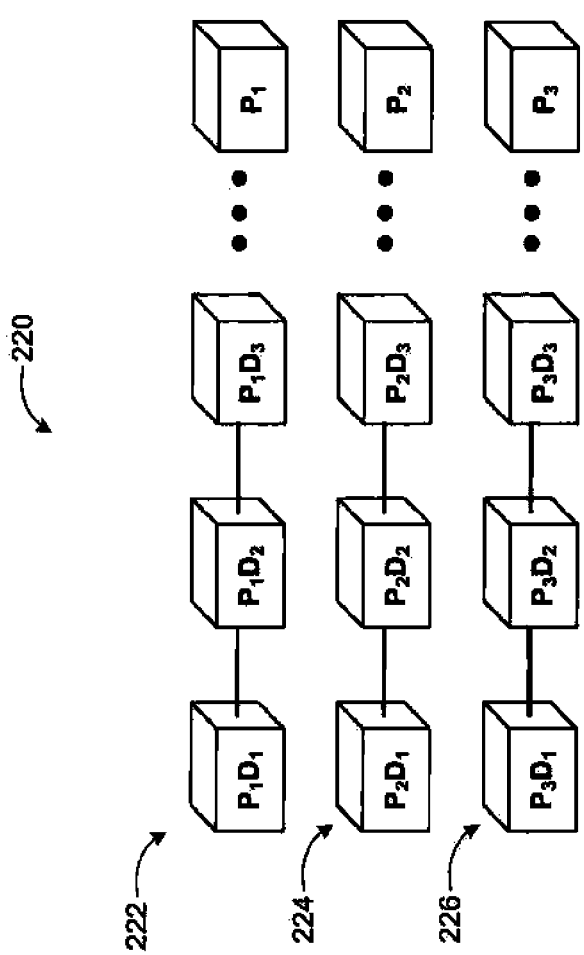

FIG. 2 conceptually illustrates an example parameterized dynamic model and an example PDM parameter that may be used in cloud migration, arranged in accordance with at least some embodiments described herein.

As depicted in FIG. 2, a diagram 200 illustrates a visualization of an example PDM 220 with three parameters 222, 224, 226 and three dimensions for each parameter according to some example embodiments. The diagram 200 further illustrates an example parameter 230 for latency with its dimensions 232, 234, and 236. For example, the dimension 232 may define an upper limit (e.g., 1 ms) for the example parameter 230, the dimension 234 may provide that the parameter is not critical (which may be used in conjunction with fault tolerance features), and the parameter 236 may further define a fault tolerance rule (e.g., "skip if ≈0.99 ms).

A PDM may provide flexibility, robustness, and precision in defining an application's requirements defined over multiple parameters that can be partitioned into multiple dimensions in an n-dimensional space virtually allowing any type of application's requirements to be defined for migration needs. Each PDM parameter may represent any control or data unit that is needed to be defined for the migration process. The parameters may define storage space, latency, computing power, power backup, uptime, and similar service levels. Each parameter may also have multiple dimensions. Thus, a number and complexity of the parameters involved in migration may be captured. In some embodiments, PDM may be an N×N dimensional model and need not be a matrix or a symmetrical model.

Parameters in the PDM may include any unit that has a measurable aspect to it. For example, an application parameter may define a 100 GB minimum storage space. Then, the parameter may be set as MinSpace=100 GB. The measurability may also be logic and not just numeric. For example, for an application requiring triple redundancy, a parameter may be defined as TripleDataRedundancy=TRUE.

A system according to embodiments may be programmed by having a PDM defined automatically, manually, or semi-automatically. For example, if a hosted application is for booking tickets, a module may automatically decide a needed maximum storage space, peak hour load limits, transaction processing timeouts, etc. These may then be automatically populated in the PDM. A manual step may also be included to override or fine-tune the parameters collected by the PDM ink the automatic populating module.

The populated PDM may further include execution data such as sequencing of parameter fulfillment (e.g., ensuring that a latency time of x units is a more critical factor than a maximum available disk storage because disk storage may be increased later). The execution data may essentially define or include other kinds of parameters in the PDM that are used by the Model Executable. Code (MEC). The MEC may be included in the PDM and may run on the target cloud or a third party service attempting to implement the PDM's requirements and to migrate an application following the sequencing stipulated in the PDM.

Figure 3:
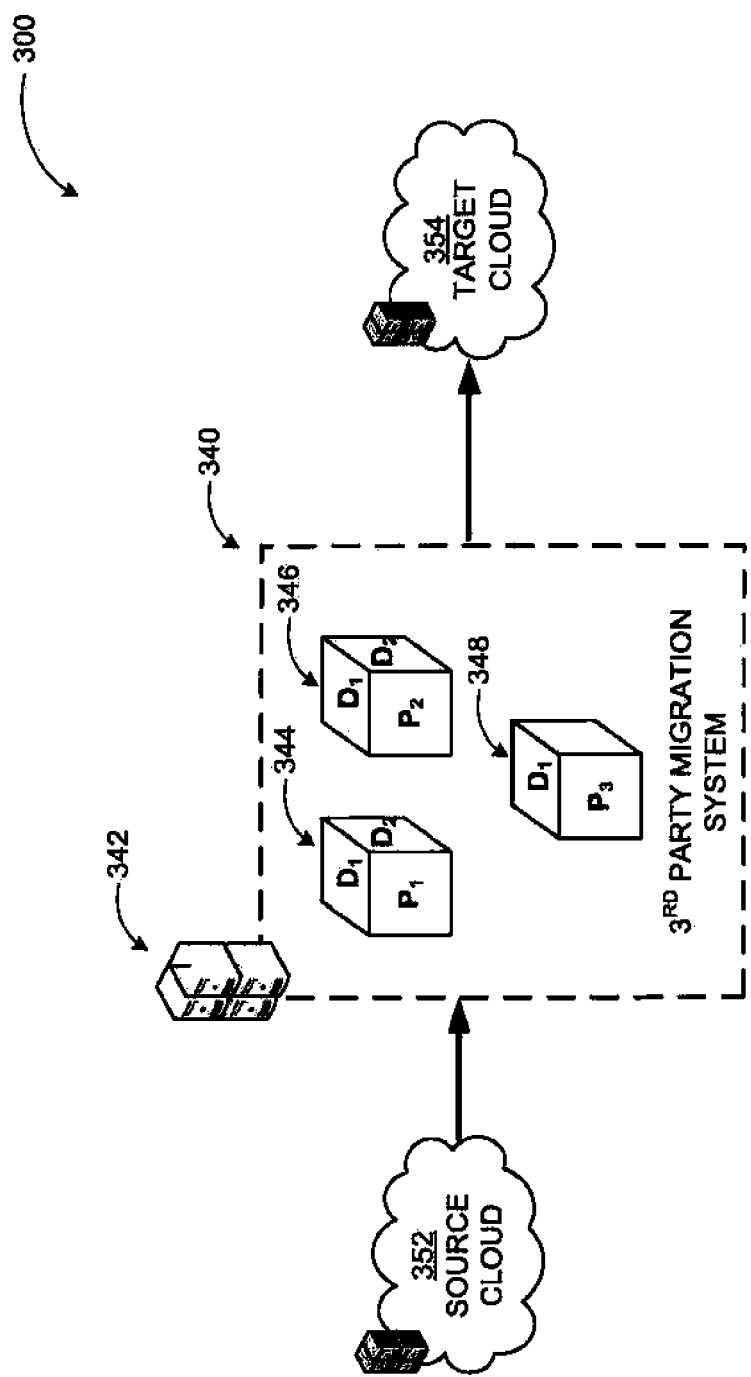
FIG. 3 illustrates execution of a PDM by a model execution code module that may be executed by a third party service.

FIG. 3 illustrates execution of a PDM by a model execution code module that may be executed by a third party service, arranged in accordance with at least some embodiments described herein.

The MEC may be tuned to execute the PDM as directed by the execution data (or sequence definitions) in the PDM. The execution data may alternately be stored the MEC. The MEC may be designed in a variety of ways. For example, shell scripts, scripts, high level programming languages may be used to form the MEC. In some examples, the MEC may take a parameter and apply it in the target environment. If a value for a parameter is not satisfied at the target environment, the MEC may return a failure. In other embodiments, the MEC may include fault-tolerance and back-tracking features allowing multiple retries or manual intervention to ramie the PDM parameters in case of failure of migration at any point. Error and final reporting of the migration attempt may be outputted by the MEC in a customizable fashion by the owner of the migrating application or data.

As depicted in FIG. 3, a diagram 300 conceptually illustrates a migration of an application from a source cloud 352 to a target cloud 354 managed by a third party migration system 340. The PDM for the migration may be defined and the migration execution code executed by one or more servers 342. The PDM may include complex migration considerations as multi-dimensional parameters. As mentioned previously, symmetry does not need to be a requirement for a multi-dimensional PDM. In the example shown in the diagram 300, three example parameters are included (P1 344, P2 346, and P3 348). The parameters P1 344 and P2 346 each have two dimensions; while the third parameter P3 348 has a single dimension.

According to some embodiments, it may not be necessary that the parameters have a one-to-one linkage to any performance parameters. Notional parameters may also be created. For example, model execution, sequencing of execution, error handling and reporting, temporary files creation, and clean-up at the target cloud may also be populated as parameters. The PDM-MEC combination according to embodiments may provide a separation of data and code during the migration process. Further, the combination provides flexible data-structure in form of the PDM that may be applied to capture the cloud migration issues.

Figure 4:
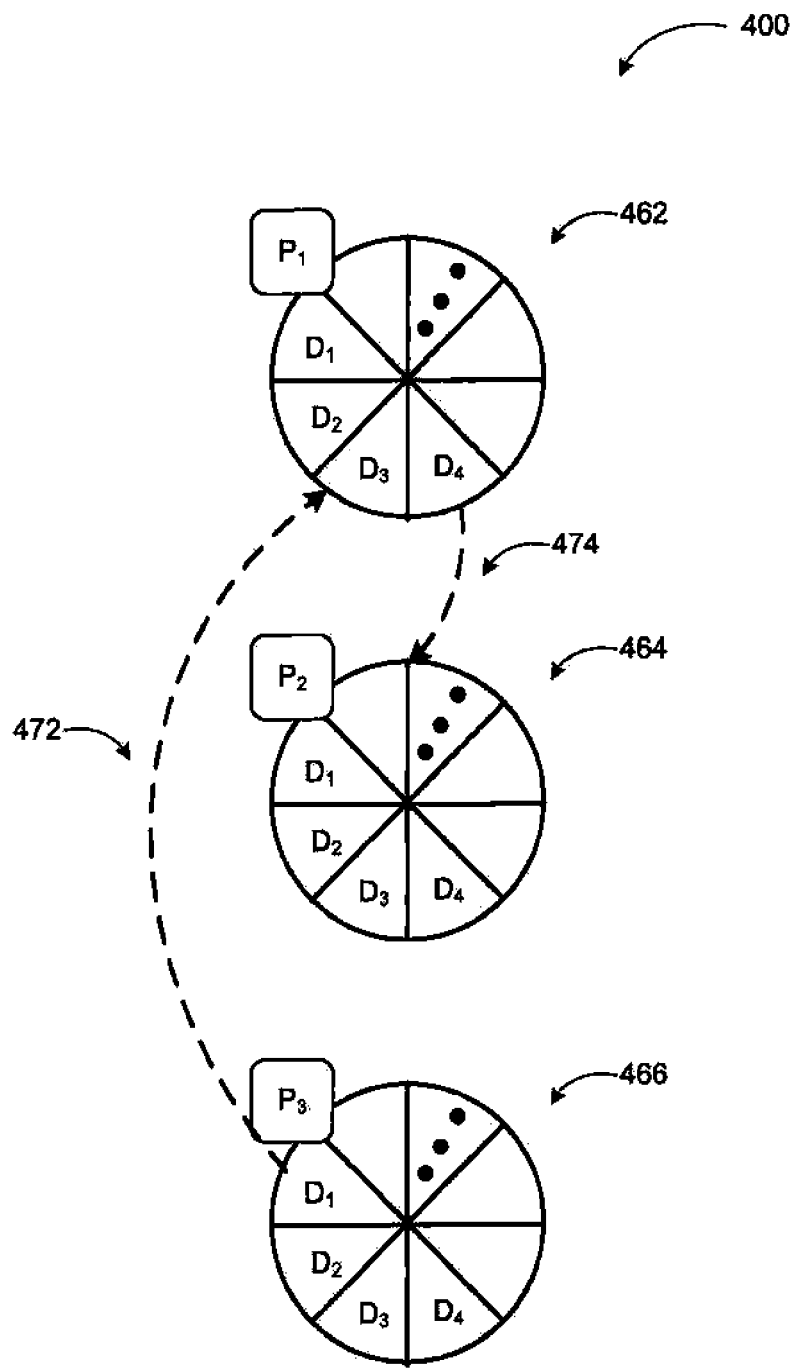
FIG. 4 illustrates an example sequencing of PDM parameters.

FIG. 4 illustrates an example sequencing of PDM parameters, arranged in accordance with at least some embodiments described herein.

As shown in a diagram 400 of FIG. 4, sequencing of PDM parameters for execution may be parameter-to-parameter, dimension-to-dimension, or dimension-to-parameter. In the diagram 400, example parameters P1 462, P2, 464, and P3 466 are conceptually visualized in pie-chart format with the dimensions of each parameter being represented by the slices.

According to one example, the sequence of the parameters may include a step 472, which may follow from dimension D1 of P3 466 to dimension D3 of P1 462 (dimension-to-dimension sequence). Another example step 474 may follow from dimension D4 of P1 462 to P2 464 (dimension-to-parameter sequence).

Figure 5:
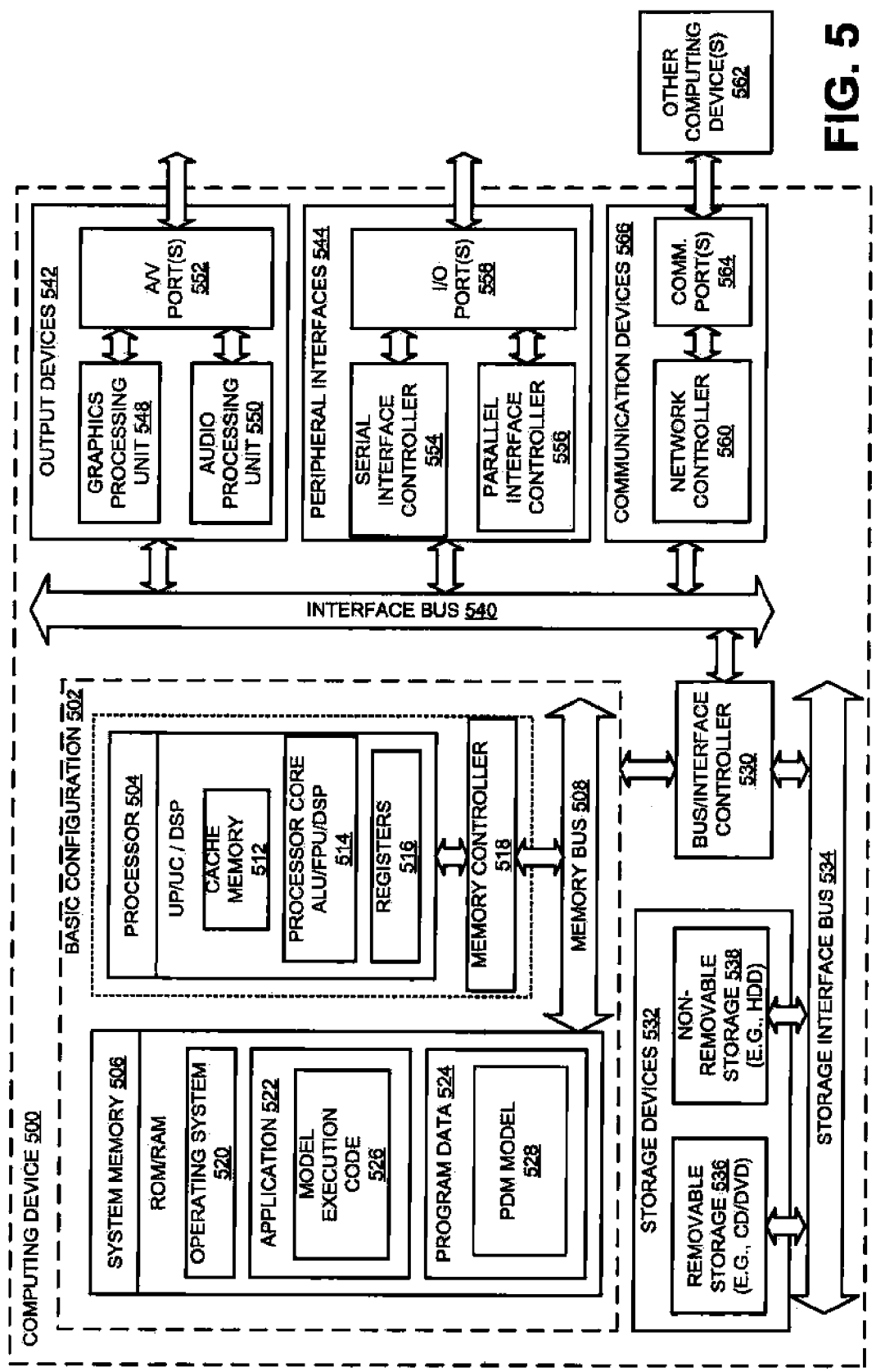
FIG. 5 illustrates a general purpose computing device, which may be used to implement a PDM for cloud migration.

FIG. 5 illustrates a general purpose computing device 500, which may be used to implement a PDM for cloud migration, arranged in accordance with at least some embodiments described herein. For example, the computing device 500 may be used as the one or more servers 342 of FIG. 3. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), microcontroller (µC), a digital signal processor (DSP), or any combination thereof. The processor 504 may include one more levels of caching, such as a level cache memory 512, a processor core 514, and registers 516. The example processor core 514 may include an arithmetic logic unit (ALU), a floating point unit (FIT), a digital signal processing core (DSP Core), or any combination thereof. An example memory controller 518 may also be used with the processor 504, or in some implementations the memory controller 510 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications 522, and program data 524. The applications 522 may include a cloud management application, a migration management application, or similar ones, including a model execution code 526, which may receive input, develop, update, and execute a parameterized dynamic model that satisfies customer requirements for migration as described herein. The program data 524 may include, among other data, a PDM 528, or the like, as described herein.

The computing, device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 518, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers at a datacenter, customer computers, and comparable devices.

The network communication link may be one example of a communication media. Communication media may typically be embodied by computer readable instructions, data structures, program modules, or other data in a mod dated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer includes any of the above functions. The computing device 500 may also be implemented as a personal computer including both laptop computer and non-laptop computer configurations.

Example embodiments may also include methods for implementing iterative simulation of requirement metrics for assumption and schema-free configuration management in cloud migration. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 6:
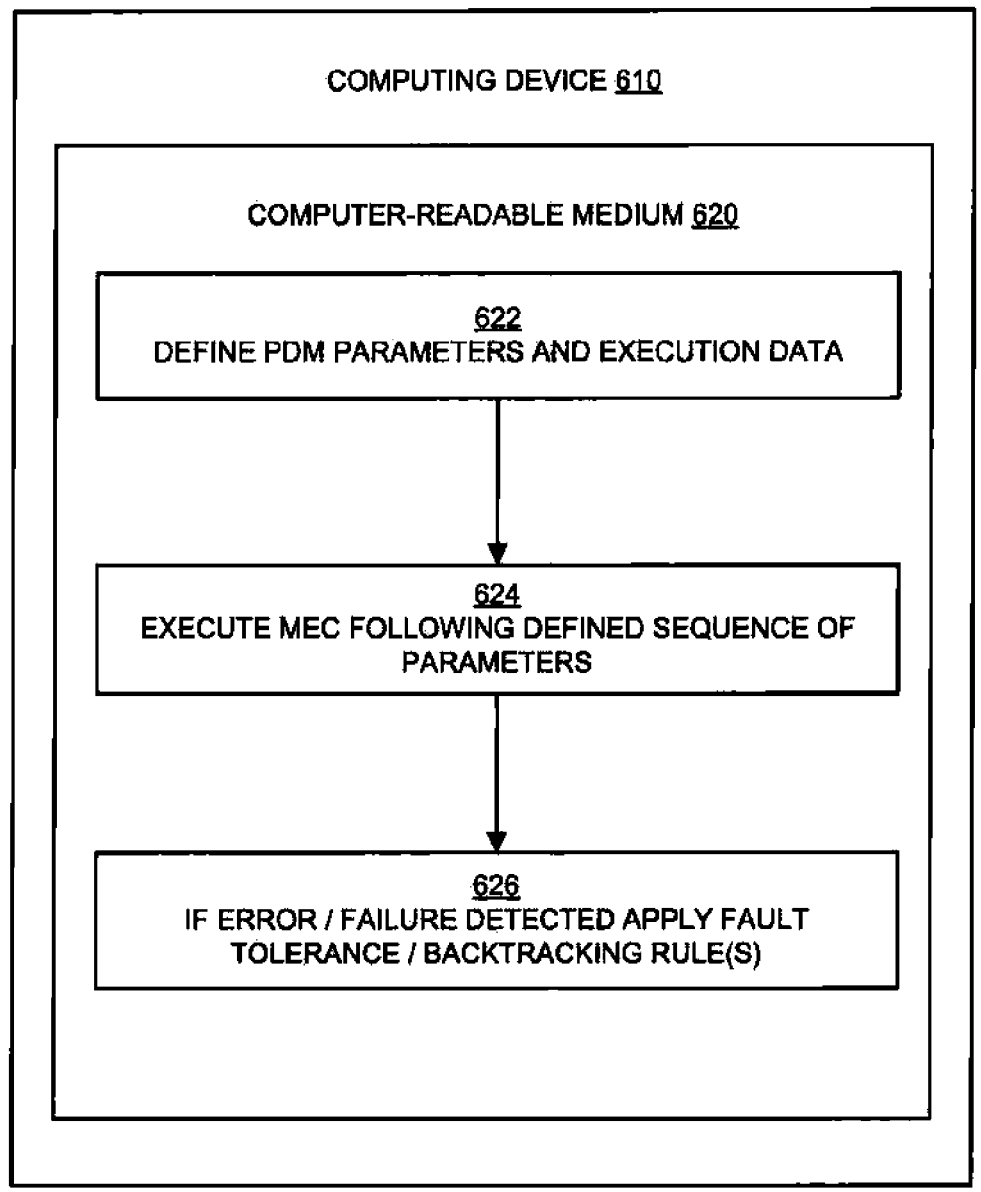
FIG. 6 is a flow diagram illustrating an example method that may be performed by a computing device such as the device in FIG. 5.

FIG. 6 is a flow diagram illustrating an example method providing a parameterized dynamic model for cloud migration that may be performed by a computing device such as the device 500 in FIG. 5 or the one or more servers 342 of FIG. 3, arranged in accordance with at least some embodiments described herein. Example methods may include one or more operations, functions or actions as illustrated by one or more of blocks 622, 624, and/or 626. The operations described in the blocks 622 through 626 may also be stored as computer-executable instructions in a computer-readable medium such as a computer-readable medium 620 of a computing device 610.

An example process of providing a parameterized dynamic model for cloud migration may begin with block 622, "DEFINE PDM PARAMETERS AND EXECUTION DATA", where multi-dimensional dynamic parameters such as the parameters 220 of FIG. 2 may be defined along with execution data by a server managing migration at a source cloud, a target cloud, or a third party entity such as the servers 342 of FIG. 3.

Block 622 may be followed by block 624, "EXECUTE MEC FOLLOWING DEFINED SEQUENCE OF PARAMETERS," where the PDM parameters may be executed by the MEC 526 of FIG. 5 following a sequence defined in the PDM, for example, by a sequence parameter.

Block 624 may be followed by block 626, "IF ERROR/FAILURE DETECTED APPLY FAULT TOLERANCE/BACKTRACKING RULE(S)". At block 626, fault tolerance and backtracking measures may be taken as defined in the PDM. For example, parameters may be skipped, migration may be stopped, alert(s) may be issued, etc.

The blocks included in the above described process are for illustration purposes. Providing a parameterized dynamic model for cloud migration may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

Figure 7:
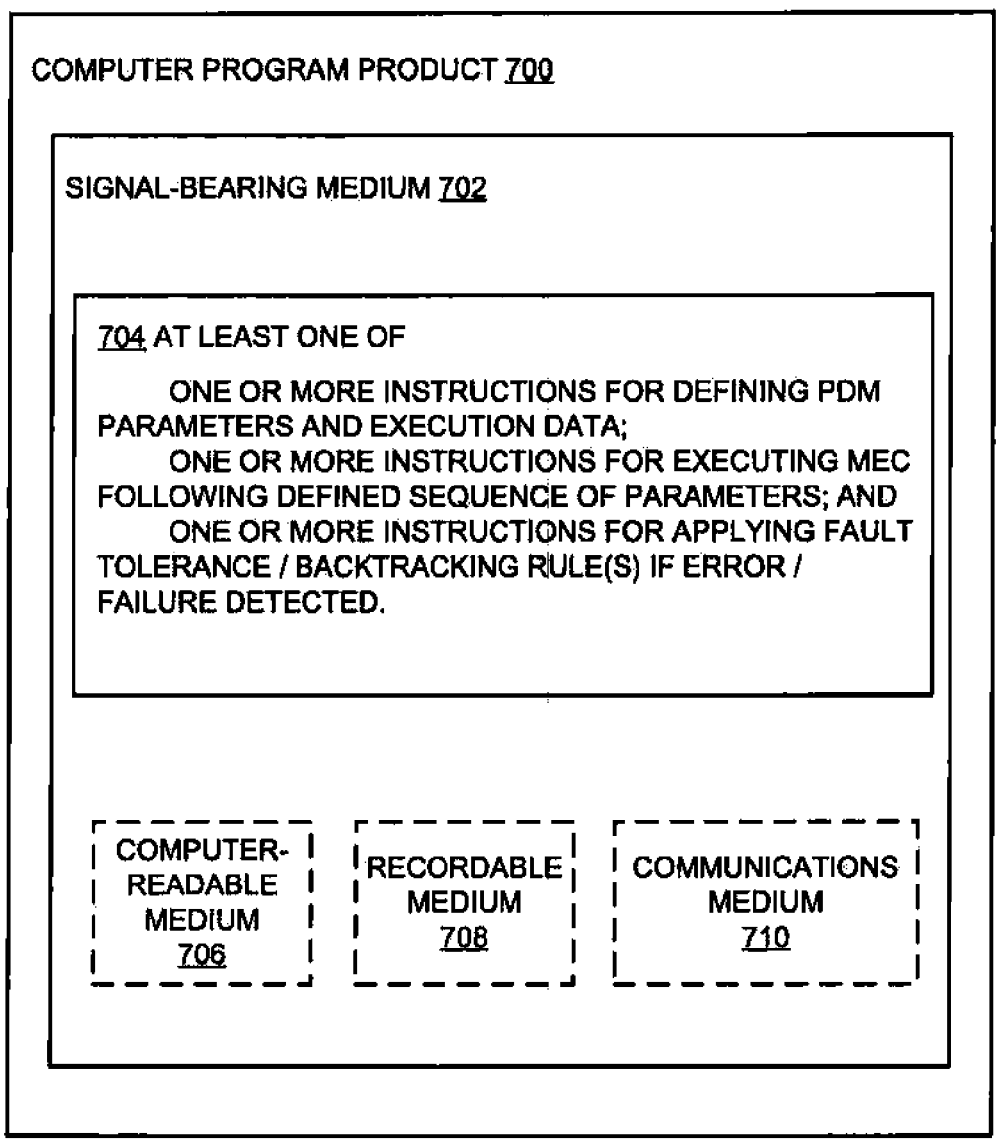
FIG. 7 illustrates a block diagram of an example computer program product, all arranged in accordance with at least some embodiments described herein.

FIG. 7 illustrates a block diagram of an example computer program product 700, arranged in accordance with at least some embodiments described herein. In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the model execution code 526 may undertake one or more of the tasks shown in FIG. 7 in response to the instructions 704 conveyed to the processor 504 by the medium 702 to perform actions associated with providing a parameterized dynamic model for cloud migration as described herein. Some of those instructions may include, for example, instructions for defining PDM parameters and execution data, executing an MEC following a defined sequence of parameters, and applying fault tolerance and/or backtracking rule(s) if an error or a failure is detected, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some example embodiments, a method for implementing a parameterized dynamic model (PDM) for cloud migration may include determining a plurality of PDM parameters with each parameter having one or more dimensions, where the PDM defines service level agreement requirements to be met for migration from a source cloud to a target cloud and performing the cloud migration by executing the PDM according to a sequence defined by the PDM.

According to other examples, the method may include defining in each dimension of a PDM parameter one from a set of a conditional limit, an attribute, a priority, and a fault tolerance action for the PDM parameter. The sequence of the PDM parameters may be defined by a model execution code (MEC) with at least one fault tolerance feature and at least one backtracking feature. The MEC may be part of one of: the PDM and an MEC module distinct from the PDM. The fault tolerance definition and the backtracking features may be defined for one of each PDM parameter and a group of PDM parameters.

According to further examples, the method may also include enabling one of multiple retries and manual intervention to retune the PDM parameters through the fault-tolerance and back-tracking features in case of migration failure. The sequence may include at least one of a parameter-to-parameter succession and a dimension-to-dimension succession. The method may further include determining the plurality of PDM parameters through at least one of automatic definition and manual definition; enabling a user to one of override and fine-tune one or more PDM parameters; and/or defining one or more dimensions of the plurality of PDM parameters based on actual measurements in one of a cloud setting and a non-cloud setting.

According to yet other examples, the plurality of PDM parameters may be determined and the PDM executed by one or more of: a source cloud operator, a target cloud operator, and a third party facilitator. The PDM parameters may define at least one from a set of: a server latency, a storage limit, a storage quota, a scalability factor, a backup guarantee, a computing power, a power backup, an uptime guarantee, a peak period load, a transaction processing timeout, a concurrent maximum users limit, a data roll back capacity, a real-time mirroring capability, a resource usage reporting capability, an audit trail capability, a support capability, and/or an automatic parallelization of code for a parallel computing environment. The dimensions of the PDM parameters may include one or more of a numeric value and a logic value. The at least two PDM parameters may have a distinct number of dimensions. And, the method may also include providing at least one of error reporting and final reporting associated with a migration attempt based on a user request. The cloud migration may include one of: a single source to multiple target migration, a multiple source to single target migration, and a multiple source to multiple target migration.

According to other example embodiments, a computing device for implementing a parameterized dynamic model (PDM) for cloud migration may include a memory configured to store instructions and a processing unit configured to execute a migration application in conjunction with the instructions. The migration application may determine a plurality of PDM parameters with each parameter having one or more dimensions, where the PDM defines service level agreement requirements to be met for migration from a source cloud to a target cloud and execute the PDM according to a sequence defined by the PDM.

According to some examples, the migration application may farther define in each dimension of a PDM parameter one from a set of a conditional limit, an attribute, a priority, and a fault tolerance action for the PDM parameter. The sequence of the PDM parameters may be defined by a model execution code (MEC) with at least one fault tolerance feature and at least one backtracking feature. The MEC may be part of one of the PDM and an MEC module distinct from the PDM. The fault tolerance definition and the backtracking features may be defined for one of each PDM parameter and a group of PDM parameters. The migration application may also enable one of multiple retries and manual intervention to retune the PDM parameters through the fault-tolerance and back-tracking features in case of migration failure.

According to other examples, the sequence may include at least one of a parameter-to-parameter succession and a dimension-to-dimension succession. The migration application may determine the plurality of PDM parameters through at least one of automatic definition and manual definition; enable one of override and fine-tune one or more PDM parameters; and/or define one or more dimensions of the plurality of PDM parameters based on actual measurements in one of a cloud setting and a non-cloud setting. The plurality of PDM parameters may be determined and the PDM executed by one or more of: a source cloud operator, a target cloud operator, and a third party facilitator.

According to yet other examples, the PDM parameters may define at least one from a set of a server latency, a storage limit, a storage quota, a scalability factor, a backup guarantee, a computing power, a power backup, an uptime guarantee, a peak period load, a transaction processing timeout, a concurrent maximum users limit, a data roll back capacity, a real-time mirroring capability, a resource usage reporting capability, an audit trail capability, a support capability, and/or an automatic parallelization of code for a parallel computing environment. The dimensions of the PDM parameters may include one or more of a numeric value and a logic value. The at least two PDM parameters have a distinct number of dimensions. The migration application may further provide at least one of error reporting and final reporting associated with a migration attempt based on a user request. And, the cloud migration may include one of a single source to multiple target migration, a multiple source to single target migration, and a multiple source to multiple target migration.

According to further example embodiments, a computer-readable storage medium may have instructions stored thereon for implementing a parameterized dynamic model (PDM) for cloud migration. The instructions may include determining a plurality of PDM parameters with each parameter having one or more dimensions, where the PDM defines service level agreement requirements to be met for migration from a source cloud to a target cloud and performing the cloud migration by executing the PDM according to a sequence defined by the PDM.

According to other examples, the instructions may further include defining in each dimension of a PDM parameter one from a set of a conditional limit, an attribute, a priority, and a fault tolerance action for the PDM parameter. The sequence of the PDM parameters is defined by a model execution code (MEC) with at least one fault tolerance feature and at least one backtracking feature. The MEC is part of one of: the PDM and an MEC module distinct from the PDM. The fault tolerance definition and the backtracking features are defined for one of each PDM parameter and a group of PDM parameters. The instructions may also include enabling one of multiple retries and manual intervention to retune the PDM parameters through the fault-tolerance and back-tracking features in case of migration failure.

According to yet further examples, the sequence may include at least one of a parameter-to-parameter succession and a dimension-to-dimension succession. The instructions may further include determining the plurality of PDM parameters through at least one of automatic definition and manual definition; enabling a user to one of override and fine-tune one or more PDM parameters; and/or defining one or more dimensions of the plurality of PDM parameters based on actual measurements in one of a cloud setting and a non-cloud setting. The plurality of PDM parameters may be determined and the PDM executed by one or more of: a source cloud operator, a target cloud operator, and a third party facilitator.

According to some examples, the PDM parameters may define at least one from a set of: a server latency, a storage limit, a storage quota, a scalability factor, a backup guarantee, a computing power, a power backup, an uptime guarantee, a peak period load, a transaction processing timeout, a concurrent maximum users limit, a data roll back capacity, a real-time mirroring capability, a resource usage reporting capability, an audit trail capability, a support capability, and/or an automatic parallelization of code for a parallel computing environment. The dimensions of the PDM parameters may include one or more of a numeric value and a logic value. The at least two PDM parameters may have a distinct number of dimensions. The instructions may also include providing at least one of error reporting and final reporting associated with a migration attempt based on a user request. The cloud migration may include one of: a single source to multiple target migration, a multiple source to single target migration, and a multiple source to multiple target migration.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile. Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering predicts to integrate such described devices and/or processes into data processing systems. That is, at least a portion of the devices and/or processes described herein may be integrated into a data processing system via a reasonable amount of experimentation. Those having skill in the art will recognize that typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the of definite articles used to introduce claim recitations. In addition, even if a specific number of an introduced claim recitation is explicitly recited, those skilled in the will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize a that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least" "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to implement a parameterized dynamic model (PDM) for cloud migration, the method comprising:
determining a plurality of PDM parameters with each parameter having one or more dimensions in an n-dimensional space, wherein the PDM defines service level agreement requirements to be met for migration from a source cloud to a target cloud; and
performing the cloud migration by executing the PDM according to a sequence defined by the PDM, wherein the PDM is a N×N dimensional model that is neither a matrix model nor a symmetrical model.

2. The method according to claim 1, further comprising: defining in each dimension of a PDM parameter one from a set of a conditional limit, an attribute, a priority, and a fault tolerance action for the PDM parameter.

3. The method according to claim 1, wherein the sequence of the PDM parameters is defined by a model execution code (MEC) with at least one fault tolerance feature and at least one backtracking feature.

4. The method according to claim 3, wherein the MEC is part of one of: the PDM and an MEC module distinct from the PDM.

5. The method according to claim 3, wherein the fault tolerance definition and the backtracking features are defined for one of each PDM parameter and a group of PDM parameters.

6. The method according to claim 3, further comprising: enabling one of multiple retries and manual intervention to retune the PDM parameters through the fault-tolerance and back-tracking features in case of migration failure.

7. A computing device to implement a parameterized dynamic model (PDM) for cloud migration, the computing device comprising:
a memory configured to store instructions; and
a processing unit configured to execute a migration application in conjunction with the instructions, wherein the migration application is configured to:
determine a plurality of PDM performance parameters and notional parameters with each parameter having one or more dimensions, wherein the PDM defines service level agreement requirements to be met for migration from a source cloud to a target cloud, and wherein the notional parameters include model execution, sequencing of execution, error handling and reporting, temporary files creation, and clean-up at the target cloud; and
execute the PDM according to a sequence defined by the PDM.

8. The computing device according to claim 7, wherein the sequence includes at least one of a parameter-to-parameter succession or a dimension-to-dimension succession.

9. The computing device according to claim 7, wherein the migration application is further configured to:
  determine the plurality of PDM parameters through at least one of automatic definition or manual definition; and
  enable one of override and fine-tune one or more PDM parameters.

10. The computing device according to claim 7, wherein the migration application is further configured to:
  define one or more dimensions of the plurality of PDM parameters based on actual measurements in one of a cloud setting and a non-cloud setting.

11. The computing device according to claim 7, wherein the plurality of PDM parameters is determined and the PDM executed by one or more of: a source cloud operator, a target cloud operator, and a third party facilitator.

12. The computing device according to claim 7, wherein the PDM parameters define at least one from a set of: a server latency, a storage limit, a storage quota, a scalability factor, a backup guarantee, a computing power, a power backup, an uptime guarantee, a peak period load, a transaction processing timeout, a concurrent maximum users limit, a data roll back capacity, a real-time mirroring capability, a resource usage reporting capability, an audit trail capability, a support capability, and/or an automatic parallelization of code for a parallel computing environment.

13. The computing device according to claim 7, wherein the dimensions of the PDM parameters include one or more of a numeric value and a logic value.

14. The computing device according to claim 7, wherein the at least two PDM parameters have a distinct number of dimensions.

15. A non-transitory computer-readable storage medium having instructions stored thereon to implement a parameterized dynamic model (PDM) for cloud migration, the instructions comprising:
  determining a plurality of PDM performance parameters and notional parameters with each parameter having one or more dimensions in an n-dimensional space, wherein the PDM defines service level agreement requirements to be met for migration from a source cloud to a target cloud, and wherein the notional parameters include model execution, sequencing of execution, error handling and reporting, temporary files creation, and clean-up at the target cloud; and
  performing the cloud migration by executing the PDM according to a sequence defined by the PDM, wherein the PDM is a N×N dimensional model that is neither a matrix model nor a symmetrical model.

16. The non-transitory computer-readable storage medium of claim 15, wherein the instructions further comprise:
  defining in each dimension of a PDM parameter one from a set of a conditional limit, an attribute, a priority, and a fault tolerance action for the PDM parameter.

17. The non-transitory computer-readable storage medium of claim 15, wherein the sequence of the PDM parameters is defined by a model execution code (MEC) with at least one fault tolerance feature and at least one backtracking feature defined for one of each PDM parameter and a group of PDM parameters, and wherein the instructions further comprise:
  enabling one of multiple retries and manual intervention to retune the PDM parameters through the fault-tolerance and back-tracking features in case of migration failure.

18. The non-transitory computer-readable storage medium of claim 15, wherein the instructions further comprise:
  determining the plurality of PDM parameters through at least one of automatic definition or manual definition;
  enabling a user to one of override and fine-tune one or more PDM parameters; and
  defining one or more dimensions of the plurality of PDM parameters based on actual measurements in one of a cloud setting and a non-cloud setting.

19. The non-transitory computer-readable storage medium of claim 15, wherein the instructions further comprise:
  providing at least one of error reporting or final reporting associated with a migration attempt based on a user request.

20. The non-transitory computer-readable storage medium of claim 15, wherein the cloud migration includes one of: a single source to multiple target migration, a multiple source to single target migration, and a multiple source to multiple target migration.

* * * * *

UNITED STATES PATENT AND TRADEMARK OFFICE
CERTIFICATE OF CORRECTION

Page 1 of 2

PATENT NO. : 8,949,654 B2
APPLICATION NO. : 13/582741
DATED : February 3, 2015
INVENTOR(S) : Hasit It is certified that error appears in the above-identified patent and that said Letters Patent is hereby corrected as shown below:

On the Title Page, in Item (75), under "Inventor", in Column 1, Line 1, delete "Hasit," and insert -- Hasit B., --, therefor.

In the Specification

In Column 1, Line 23, delete "cloud" and insert -- clouds --, therefor.

In Column 2, Line 20, delete "embodiments" and insert -- embodiments, --, therefor.

In Column 3, Line 15, delete "ppm" and insert -- PDM --, therefor.

In Column 3, Line 18, delete "sequencing," and insert -- sequencing --, therefor.

In Column 3, Line 66, delete "one" and insert -- one or --, therefor.

In Column 4, Line 48, delete "ink" and insert -- in --, therefor.

In Column 4, Line 56, delete "Executable." and insert -- Executable --, therefor.

In Column 4, Line 67, delete "stored" and insert -- stored in --, therefor.

In Column 5, Line 8, delete "ramie" and insert -- retune --, therefor.

In Column 5, Line 24, delete "dimensions;" and insert -- dimensions, --, therefor.

In Column 5, Line 65, delete "microcontroller" and insert -- a microcontroller --, therefor.

In Column 6, Line 3, delete "(FIT)," and insert -- (FPU), --, therefor.

Signed and Sealed this
Twenty-first Day of July, 2015

Michelle K. Lee
*Director of the United States Patent and Trademark Office*

CERTIFICATE OF CORRECTION (continued)
U.S. Pat. No. 8,949,654 B2

In Column 6, Line 21, delete "computing," and insert -- computing --, therefor.

In Column 6, Line 29, delete "518," and insert -- 538, --, therefor.

In Column 7, Line 10, delete "mod dated" and insert -- modulated --, therefor.

In Column 7, Line 25, delete "computer" and insert -- computer that --, therefor.

In Column 9, Line 53, delete "farther" and insert -- further --, therefor.

In Column 9, Line 59, delete "of" and insert -- of: --, therefor.

In Column 10, Line 12, delete "of" and insert -- of: --, therefor.

In Column 10, Line 26, delete "of" and insert -- of: --, therefor.

In Column 12, Line 19, delete "Versatile." and insert -- Versatile --, therefor.

In Column 12, Lines 26-27, delete "predicts" and insert -- practices --, therefor.

In Column 12, Line 32, delete "that" and insert -- that a --, therefor.

In Column 13, Line 32, delete "of" and insert -- use of --, therefor.

In Column 13, Line 35, delete "the" and insert -- the art --, therefor.

In Column 13, Line 56, delete "a that" and insert -- that --, therefor.

In Column 14, Line 2, delete ""at least"" and insert -- "at least," --, therefor.